United States Patent
Kato et al.

(10) Patent No.: US 9,500,804 B2
(45) Date of Patent: *Nov. 22, 2016

(54) SILICON PHOTONICS DEVICE AND COMMUNICATION SYSTEM THEREFOR

(71) Applicant: INPHI CORPORATION, Santa Clara, CA (US)

(72) Inventors: Masaki Kato, Palo Alto, CA (US); Radha Nagarajan, Cupertino, CA (US)

(73) Assignee: INPHI CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/080,476

(22) Filed: Mar. 24, 2016

(65) Prior Publication Data

US 2016/0209590 A1 Jul. 21, 2016

Related U.S. Application Data

(63) Continuation of application No. 14/262,621, filed on Apr. 25, 2014, now Pat. No. 9,329,337.

(51) Int. Cl.

| G02B 6/00 | (2006.01) |
|---|---|
| G02B 6/10 | (2006.01) |
| G02B 6/126 | (2006.01) |
| G02B 6/12 | (2006.01) |
| G02B 6/27 | (2006.01) |
| G02B 6/293 | (2006.01) |
| G02B 6/28 | (2006.01) |
| G02B 6/122 | (2006.01) |

(52) U.S. Cl.
CPC ............. *G02B 6/105* (2013.01); *G02B 6/122* (2013.01); *G02B 6/126* (2013.01); *G02B 6/12014* (2013.01); *G02B 6/12023* (2013.01); *G02B 6/2773* (2013.01); *G02B 6/2861* (2013.01); *G02B 6/2938* (2013.01); *G02B 2006/1215* (2013.01); *G02B 2006/12123* (2013.01)

(58) Field of Classification Search
CPC ...................... G02B 6/105; G02B 2006/1215
See application file for complete search history.

(56) References Cited

U.S. PATENT DOCUMENTS

| | | | | |
|---|---|---|---|---|
| 5,379,142 A * | 1/1995 | Handa | ............... | G02B 6/126 385/24 |
| 5,414,548 A * | 5/1995 | Tachikawa | ......... | G02B 6/12014 385/14 |
| 5,809,184 A * | 9/1998 | Doerr | ................. | G02B 6/12016 385/11 |
| 5,933,265 A | 8/1999 | Nagarajan | | |
| 5,937,113 A * | 8/1999 | He | ............................ | G01J 3/02 385/11 |
| 6,657,723 B2 * | 12/2003 | Cohen | ................. | G02B 6/12007 356/328 |
| 7,058,263 B2 | 6/2006 | Welch et al. | | |
| 7,236,656 B2 | 6/2007 | Welch et al. | | |
| 7,447,403 B2 * | 11/2008 | Kirk | ................... | G02B 6/12007 385/15 |

(Continued)

*Primary Examiner* — Rhonda Peace
(74) *Attorney, Agent, or Firm* — Richard T. Ogawa; Ogawa P.C.

(57) ABSTRACT

A silicon photonics device and system therefor. The silicon photonics device can include a 300 nm SOI (silicon-on-insulator with 300 nm top Si) overlying a substrate member. A waveguide structure can be configured from a portion of the SOI layer and disposed overlying the substrate member. This waveguide structure can include an AWG (Arrayed Waveguide Gratings) structure with 300 nm×300 nm symmetric grating waveguides or an Echelle grating structure characterized by a top silicon thickness of 300 nm. The waveguide structure can also include an index compensator material configured to provide at least two material index ratings in the waveguide structure.

9 Claims, 13 Drawing Sheets

(56) References Cited

U.S. PATENT DOCUMENTS

| | | |
|---|---|---|
| 8,110,823 B2 | 2/2012 | Bowers |
| 8,380,033 B1 | 2/2013 | Fang et al. |
| 9,329,337 B2 * | 5/2016 | Kato ........................ G02B 6/12 |
| 2002/0021863 A1 * | 2/2002 | Ogawa ............... G02B 6/12011 |
| | | 385/24 |
| 2010/0215374 A1 * | 8/2010 | Liu .................... H04B 10/5053 |
| | | 398/98 |
| 2010/0322631 A1 * | 12/2010 | Nagarajan .......... G02B 6/12004 |
| | | 398/65 |
| 2015/0309252 A1 * | 10/2015 | Kato ........................ G02B 6/12 |
| | | 385/11 |

* cited by examiner

SILICON PHOTONICS DEVICE AND COMMUNICATION SYSTEM THEREFOR

CROSS-REFERENCE TO RELATED APPLICATIONS

The present application is a continuation of U.S. patent application Ser. No. 14/262,621 filed Apr. 25, 2014, the entire content of which is incorporated herein by reference.

BACKGROUND OF THE INVENTION

The present invention relates to telecommunication techniques and integrated circuit (IC) devices. More specifically, embodiments of the present invention provide a silicon photonics device having improved wavelength sensitivity to device dimensions and a communication interface using the silicon photonics device.

Over the last few decades, the use of communication networks has exploded. In the early days of the Internet, popular applications were limited to emails, bulletin board, and mostly informational and text-based web page surfing, and the amount of data transferred was relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

CMOS technology is commonly used to design communication systems implementing Optical Fiber Links. As CMOS technology is scaled down to make circuits and systems run at higher speed and occupy smaller chip (die) area, the operating supply voltage is reduced for lower power consumption. Conventional FET transistors in deep-submicron CMOS processes have very low breakdown voltage as a result the operating supply voltage is maintained around 1 Volt. The Photo-detectors (PD) used in 28G and 10G Optical Receivers require a bias voltage of more than 2 Volts across the anode and cathode nodes of the PD for better photo-current responsivity. These limitations provide significant challenges to the continued improvement of communication systems scaling and performance.

There have been many types of communication systems and methods. Unfortunately, they have been inadequate for various applications. Therefore, improved communication systems and methods are desired.

BRIEF SUMMARY OF THE INVENTION

The present invention relates to telecommunication techniques and integrated circuit (IC) devices. More specifically, embodiments of the present invention provide a silicon photonics device having improved wavelength sensitivity to device dimensions and a communication interface using the silicon photonics device. In certain embodiments, the silicon photonics device can be implemented as an optical (de) multiplexer, a polarization diversity receiver, or the like.

In an embodiment, the present invention provides a silicon photonics device and system therefor. The silicon photonics device can include a 300 nm SOI (silicon-on-insulator with 300 nm top Si) overlying a substrate member. A waveguide structure can be configured from a portion of the SOI layer and disposed overlying the substrate member. This waveguide structure can include a 300 nm×300 nm symmetric AWG (Arrayed Waveguide Gratings) structure or an Echelle grating structure characterized by a top silicon thickness of 300 nm. The waveguide structure can also include a polarization compensator material configured to provide at least two material index ratings in the waveguide structure. The silicon photonics device can be configured within a monolithically integrated system on a chip device to provide fiber optic telecommunication functions.

In an embodiment, the present invention provides various silicon photonics device configurations of polarization diversity receivers. The silicon photonics device can include a PBS (Polarization Beam Splitter) overlying a substrate member. The PBS can have a TE+TM (Transverse Electric+ Transverse Magnetic) input and a TE output and a TM output. A TE optimized demux (demultiplexer) can be configured overlying the substrate member, and can have a TE demux input coupled to the TE output, the TE optimized demux having a plurality of TE demux outputs. Also, a TM optimized demux can be configured overlying the substrate member. The TM optimized demux can have a TM demux input coupled to the TM output, the TM optimized demux having a plurality of TM demux outputs. Furthermore, a plurality of PD (photodiode) structures can be provided overlying the substrate. Each of these PD structures can be coupled to one of the plurality of TE demux outputs by a TE-PD path and one of the plurality of TM demux outputs by a TM-PD path.

Many benefits are recognized through various embodiments of the present invention. Such benefits include reduced sensitivity to thickness changes in crystalline silicon thickness and and/or waveguide width. Silicon photonics devices using the 300 nm SOI wafer can be characterized by polarization independence and can be substantially free of polarization dependent wavelength shifts. Using symmetric waveguide geometry, light signals can be transmitted being substantially free from time delays between TE and TM light. Other benefits will be recognized by those of ordinary skill in the art that the mechanisms described can be applied to other communications systems as well.

The present invention achieves these benefits and others in the context of known data transmission and memory technologies. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1B:
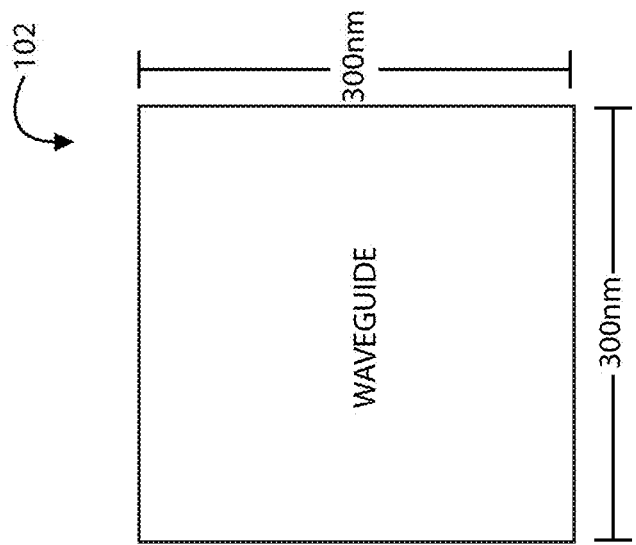
FIG. 1B is a simplified diagram illustrating a symmetric waveguide using a SOI substrate according to an embodiment of the present invention.

The present invention relates to telecommunication techniques and integrated circuit (IC) devices. More specifically, various embodiments of the present invention provide integrated silicon photonics devices.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Silicon photonics devices use silicon as an optical medium for fiber optic telecommunication systems. Research and development of these silicon photonics devices allows for the combination of optical and electronic components integrated onto a single chip. The silicon is typically formed overlying an insulating material, otherwise known as SOI (silicon on insulator). However, standard SOI wafers exhibit some significant problems. Standard SOI wafers used for silicon photonics devices typically are 220 nm SOI wafers (silicon-on-insulator substrate with 220 nm top Si layer).

Standard waveguide designs (220 nm×450 nm for 1300 nm wavelength window, 220 nm×500 nm for 1550 nm wavelength window) exhibit very large polarization dependence. Using this standard design as reference (220 nm×450 nm/500 nm waveguide), the effective index $N_{eff}$ is 2.7 for a TE (Transverse Electric) mode and 2.3 for a TM (Transverse Magnetic) mode. This causes a very large PDWS (polarization dependent wavelength shift) when used for an AWG (Arrayed Waveguide Gratings), which are commonly used as optical (de)multiplexers. Also, the group index $N_g$ is 4.1 for TE and 4.6 for TM for the same waveguide. For a 1 mm long waveguide there is a 1.7 ps delay between TE and TM light (TM is slower).

Figure 1A:
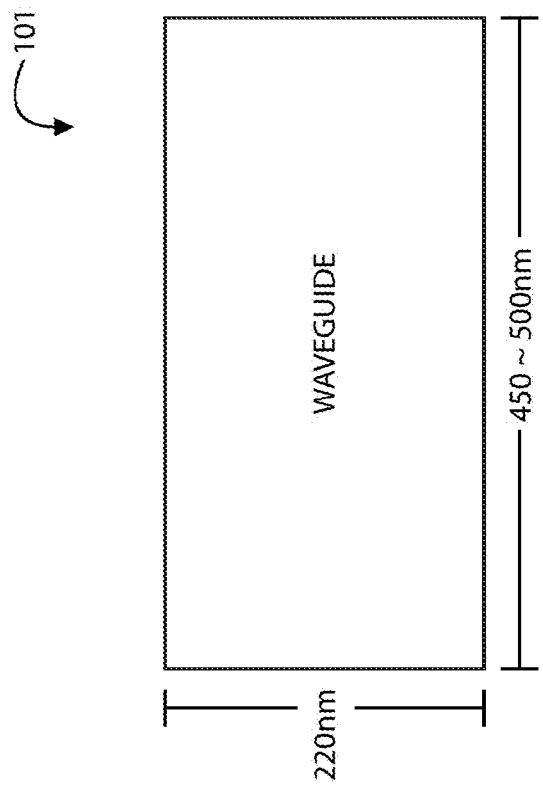
FIG. 1A is a simplified diagram illustrating a conventional waveguide using a standard SOI (silicon-on-insulator) substrate.

FIGS. 1A and 1B are simplified diagrams illustrating a conventional waveguide using a standard SOI (silicon-on-insulator) substrate and a symmetric waveguide using a SOI substrate according to an embodiment of the present invention, respectively. As shown, FIG. 1A depicts a standard waveguide 101 with the dimensions 220 nm×450 nm. According to an embodiment, an object of the present invention addresses problems of standard SOI wafers for silicon photonics devices by utilizing a 300 nm SOI wafer to establish polarization independence. Particularly, a 300 nm×300 nm waveguide eliminates polarization dependence by use of symmetric geometry. This waveguide 102 is shown in FIG. 1B. For this waveguide embodiment (300 nm×300 nm), $N_{eff}$ is 2.6 for both TE and TM and $N_g$ is 4.4 for both TE and TM. Using this configuration, the PDWS issue is substantially eliminated and there is no time delay between the TE and TM light.

Figure 2:
FIG. 2 is a table describing multiple configurations of silicon photonics devices and wavelength sensitivity to dimensions according to various embodiments of the present invention.

FIG. 2 is a table describing multiple configurations of silicon photonics devices according to various embodiments of the present invention. As shown, the first configuration is an AWG with a 300 nm SOI wafer. The two specifications shown include crystalline Si (Silicon) thickness and waveguide width, and the related parameter for comparison is sensitivity to dimensions. With the first configuration, the light transmission exhibits a 1 nm λc (center wavelength of AWG) shift for a 1 nm thickness change in Si thickness and exhibits a 1 nm λc shift for a 1 nm width change in waveguide width.

The second configuration is an AWG with 220 nm SOI wafer. The same specifications and parameters are considered. For Si thickness, TE light exhibits a 3 nm λc shift and TM exhibits a 4.7 nm λc shift for a 1 nm change. For waveguide width, TE light exhibits a 0.6 nm λc shift and TM light exhibits a 0.3 nm λc shift for a 1 nm change. Compared to the symmetric 300 nm SOI wafer configuration, this configuration shows much larger center wavelength sensitivities to thickness variation.

The third configuration is an Echelle grating, a type of diffraction grating characterized by relatively low groove density, with 300 nm SOI wafer. The only specification considered here is crystalline Si thickness. With TE light, a 0.7 nm λc shift is exhibited for a 1 nm thickness change. With TM light, a 1.8 nm λc shift is exhibited for a 1 nm thickness change. Compared to the fourth configuration, the symmetric 300 nm SOI wafer shows benefits as well. The fourth configuration is an Echelle grating with 220 nm SOI wafer. With TE light, a 1.2 nm λc shift is exhibited for a 1 nm thickness change. With TM light, 4 nm λc shift is exhibited for a 1 nm thickness change. Shown by the comparisons between the $1^{st}$ and $2^{nd}$ configurations, as well as the $3^{rd}$ and $4^{th}$ configurations, it is shown that the 300 nm SOI wafer is less sensitive to Si thickness than the 220 nm SOI wafer.

In an embodiment, the present invention provides various configurations of polarization diversity receivers. These receivers can function in interferometric measurement and sensing systems and can include a PBS (Polarization Beam Splitter) or a PBC (Polarization Beam Combiner). FIGS. 3A-3D are simplified block diagrams illustrating polarization diversity receiver configurations according to various embodiments of the present invention.

Figure 3A:
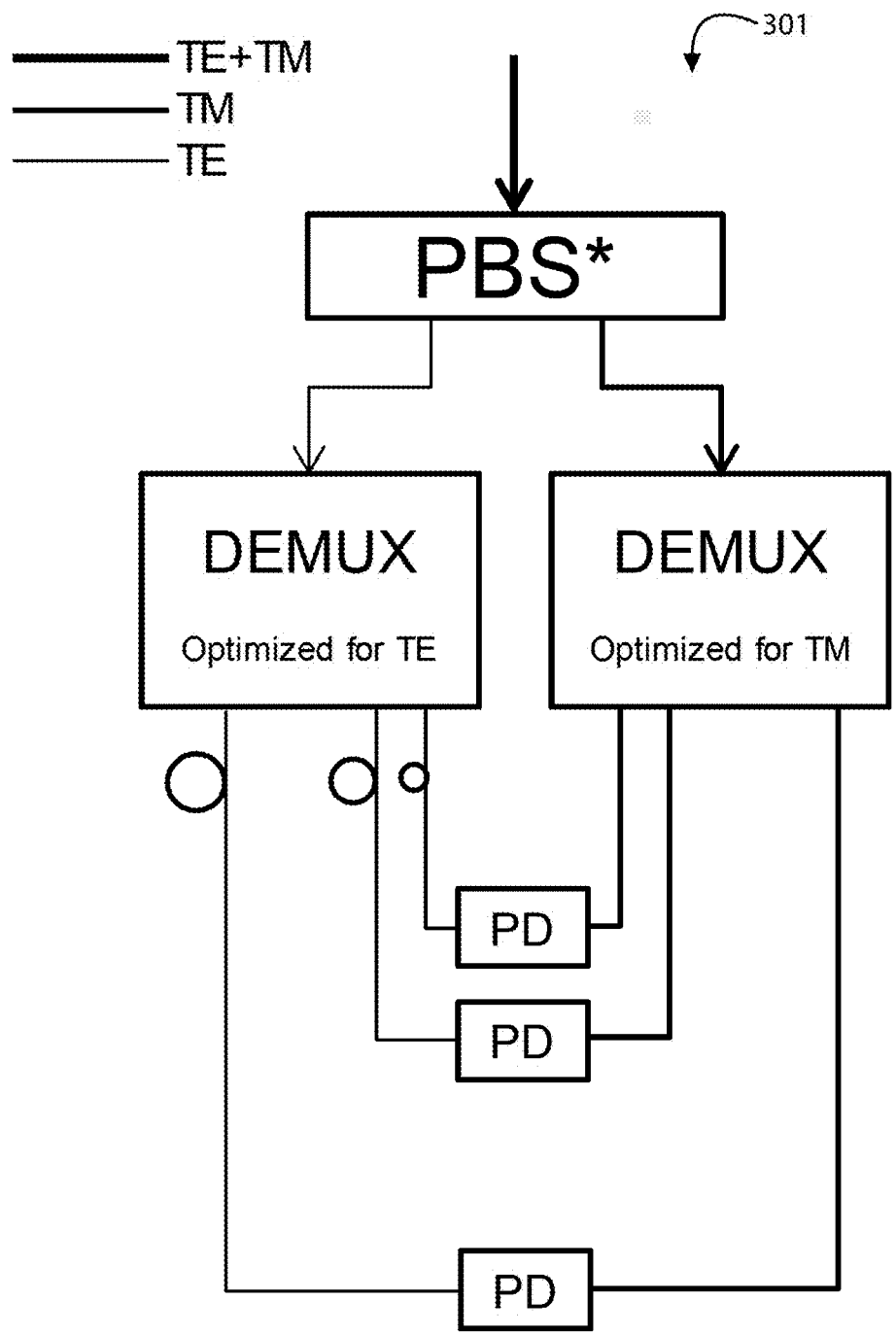
FIGS. 3A-3D are simplified block diagrams illustrating polarization diversity receiver configurations according to various embodiments of the present invention.

As shown, FIG. 3A depicts a configuration 301 with a TE+TM signal entering a PBS, which splits the signal into TE and TM signals. The PBS is coupled to two demux (demultiplexer) blocks, each being optimized for one of the TE and TM signals. The TE signal directed to the TE demux, with one or more TE demux outputs, and the TM signal is directed to the TM demux, with one or more TM demux outputs. The one or more TE demux outputs and one or more TM demux outputs are coupled in pairs to PDs (Photo Diodes). In a specific embodiment, if the path length of the demux outputs is long, delay lines may be needed to compensate time delay due to group index difference between the TE and TM signals.

Figure 3B:
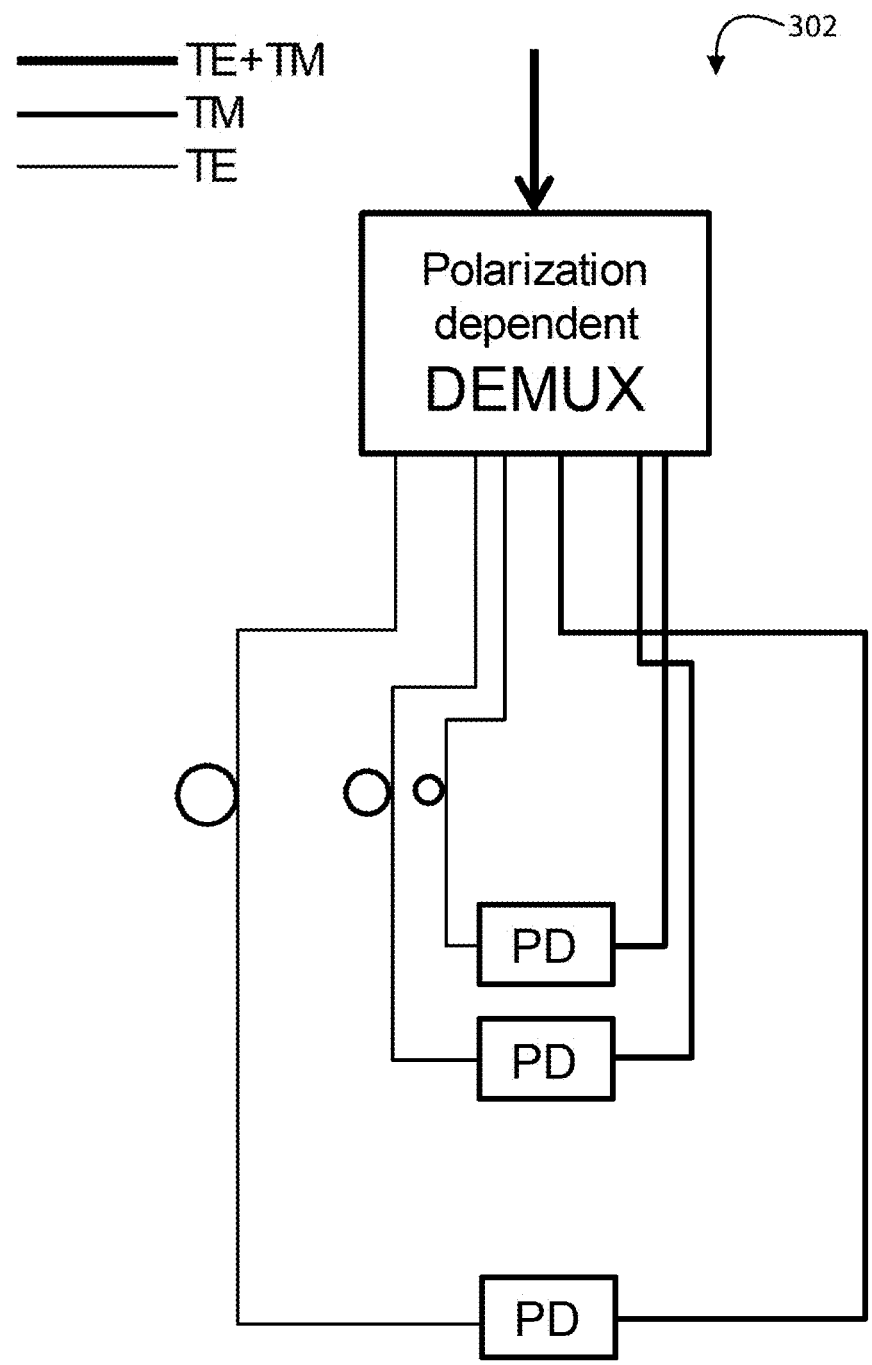

FIG. 3B depicts configuration 302 with a TE+TM signal entering a polarization dependent demux, which can be similar to the PBS coupled a TE optimized demux and a TM optimized demux. Here, the path lengths of the various TE demux output lines and the TM demux output lines are configured asymmetrically in order to match the time delay due to group index differences. Similar to FIG. 3A, the TE and TM outputs from the demux blocks are shown to be coupled to photodiodes from opposite sides.

Figure 3C:
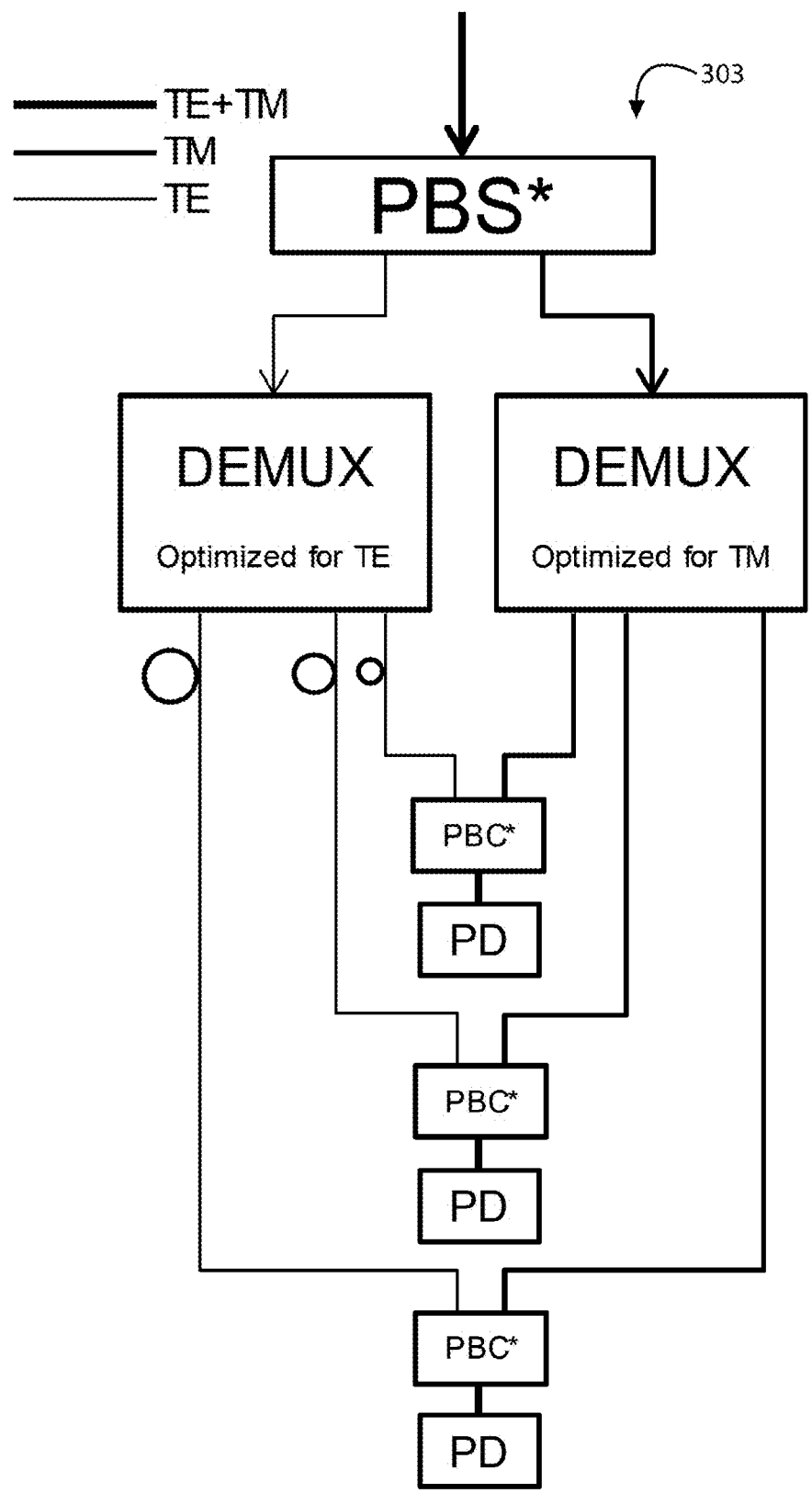

FIG. 3C depicts configuration 303 with a PBS coupled to two separately optimized demux blocks, similar to FIG. 3A. The path lengths of the demux block outputs are shown to be symmetric here, however, instead of the demux outputs being coupled directly to photodiodes, they are first coupled to a PBC. The output of the combiner is then coupled to the photodiode. Compared to configurations 301 and 302, the TE and TM outputs are combined into a TE+TM output that is coupled to a photodiode on one side. In a specific embodiment, very compact PBS/PBC, directional coupler based or MMI (multimode interference) based, can be made in silicon photonics due to the material birefringence.

Figure 3D:
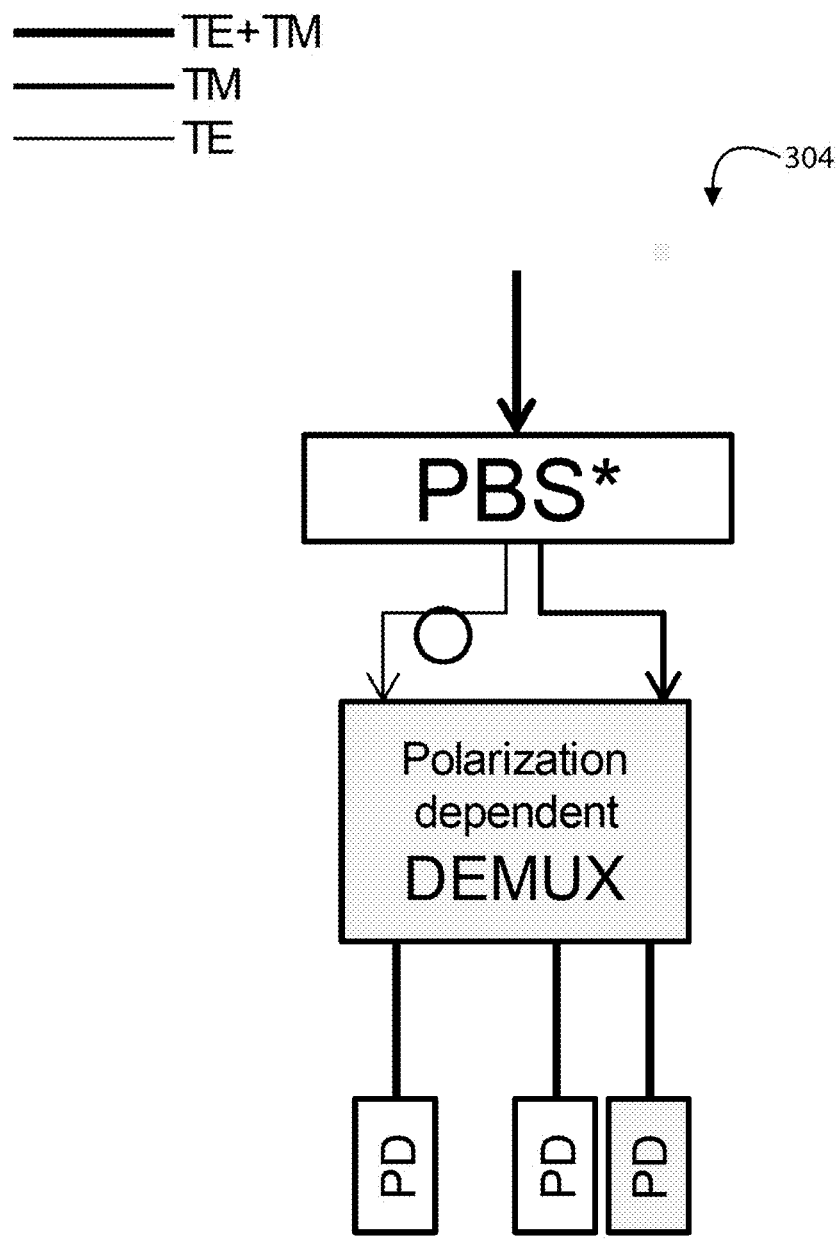

FIG. 3D depicts configuration 304 with a PBS coupled to a polarization dependent demux. Here, the PBS splits the TE and TM signals, which feed into the polarization dependent demux. Input waveguide locations into the demux for TE and TM signals can be chosen such that both the TE and TM signals focus into the identical waveguide. This demux outputs TE+TM signal outputs coupled to photodiodes. In this case, the path lengths to the photodiodes should be close enough such that the common delay line works.

Figure 4A:
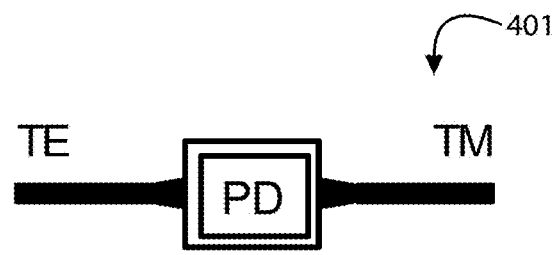
FIGS. 4A-4C are simplified block diagrams illustrating coupling configurations for photodiodes according to various embodiments of the present invention.
Figure 4B:
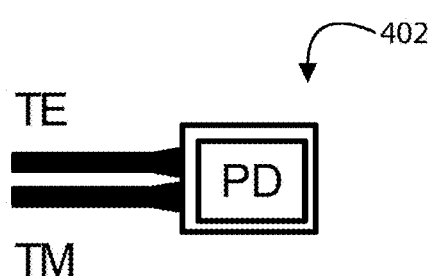
Figure 4C:
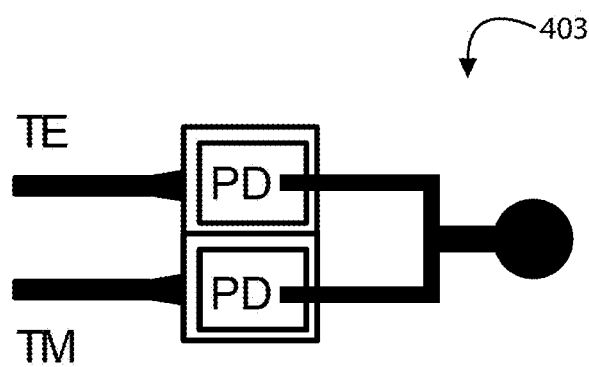

FIGS. 4A-4C are simplified block diagrams illustrating coupling configurations for photodiodes according to various embodiments of the present invention. These configurations can be applied to any of the configurations shown in FIGS. 3A-3D. FIG. 3A shows TE and TM signals coming from different sides of the PD. FIG. 3B shows both TE and TM signals coming from the same side of the PD, though being offset from the center). FIG. 3C shows TE and TM signals going into two separate PDs, both of these PDs being electrically connected. Those of ordinary skill in the art will recognize other variations, modifications, and alternatives.

Figures 5A, 5B:
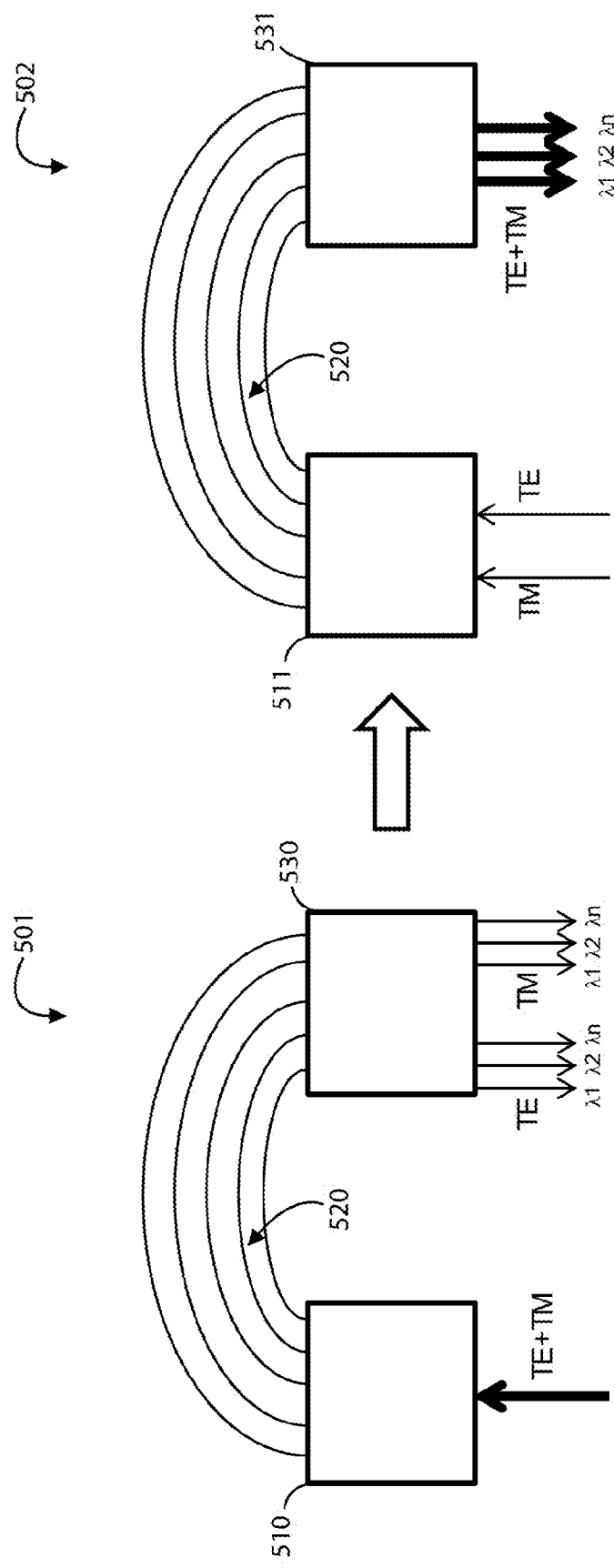
FIGS. 5A-5D are simplified diagrams illustrating diffraction grating configurations according to various embodiments of the present invention.

FIGS. 5A-5D are simplified diagrams illustrating diffraction grating configurations according to various embodiments of the present invention. As shown in FIG. 5A, AWG device 501 can include a first propagation region 510 and a second propagation region 530 coupled together by grating waveguides 520. Input coupler to the first propagation region 510 shows the input of a TE+TM signal. These signals are diffracted from each grating waveguide and refocused at the second propagation region 530. The output of the second region 530 shows separate TE and TM signals denoted by numbered lambda symbols. In a specific embodiment, the TE and TM signals come out of different locations due to index differences between the signals. Due to this index difference, the TE and TM signals are naturally separated into two separate focal regions.

FIG. 5B shows a similar configuration to FIG. 5A, however the input signals at separate TE and TM signals into the first propagation region 510 and the output from the second propagation region are TE+TM signals denoted by lambda symbols. By having separation of the inputs for TE and TM (and having optimized locations), TE and TM come out of the same location.

In various embodiments, PBS and PBC devices can be constructed using the concepts shown in FIGS. 5A and 5B. These ideas can also be applied to Echelle grating structures. Using an MMI or a directional coupler, the device dimensions can be optimized to take advantage of the birefringence in the material/waveguide to separate TE and TM modes.

Figure 5C:
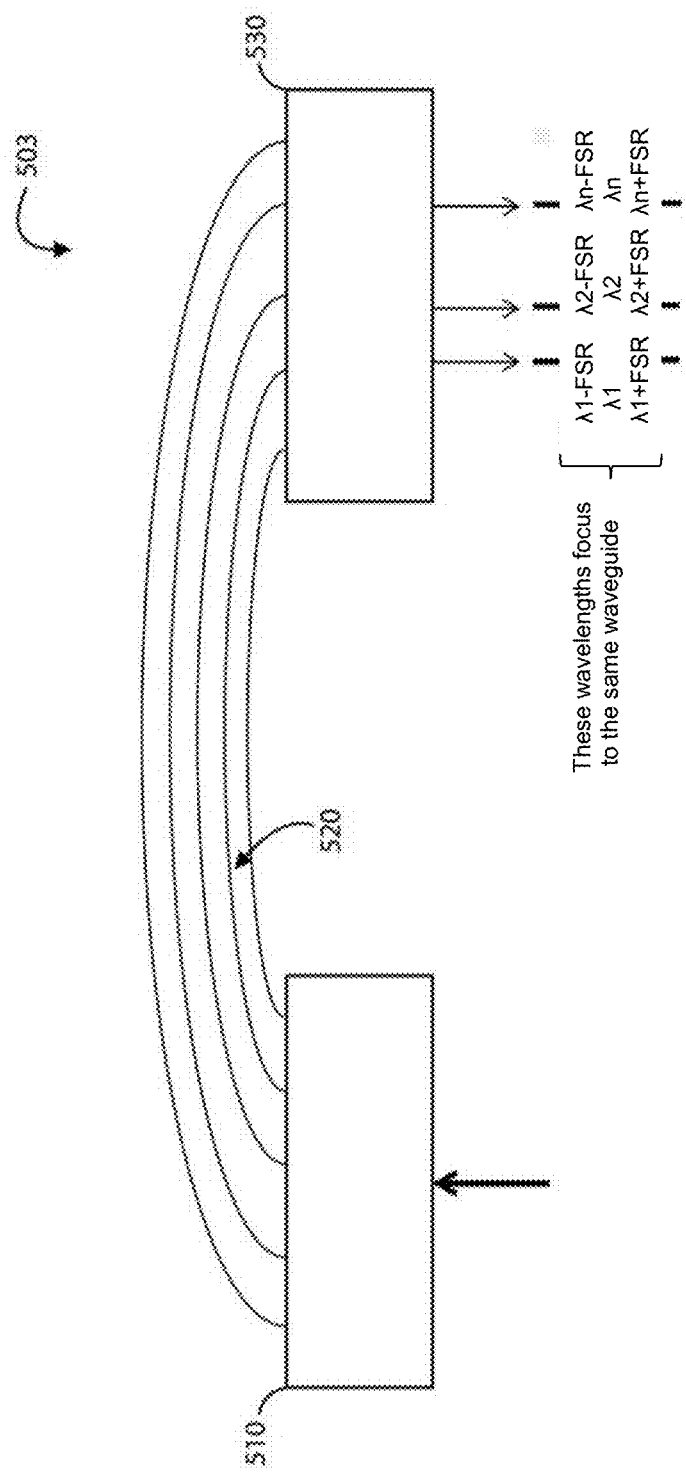

FIG. 5C shows a polarization independent multiplexer/demultiplexer using a repeating feature of AWG. The same idea can be applied to Echelle grating. Configuration 503 shows a similar structure to FIGS. 5A and 5B, with a first propagation region 510 coupled to a second propagation region 530 by a diffraction grating structure 520. As noted on the figure, the wavelengths with different diffraction orders (wavelengths are separated by n×FSR, n: integer, FSR: free spectral range) focus to the same waveguide. By adjusting the birefringence of grating arms in such a way that TE and TM lights with different grating orders focus to the same waveguide, (de)multiplexor can be polarization independent.

As an example, two diffraction grating structures are considered (original λc defined by material index). In these examples, TM light focuses to the same waveguide as TE light, but the grating order for TM light is m−1.
1. AWG with 220 nm×450 nm WVG
   a. Grating order m=6
   b. λc for TE=1300 nm
   c. λc for TM=1299.2 nm (=1082.5 nm+FSR)
2. Echelle with 300 nm top Si
   a. Grating order m=12
   b. λc for TE=1300 nm
   c. λc for TM=1299 nm (1190.7 nm+FSR)

Figure 5D:
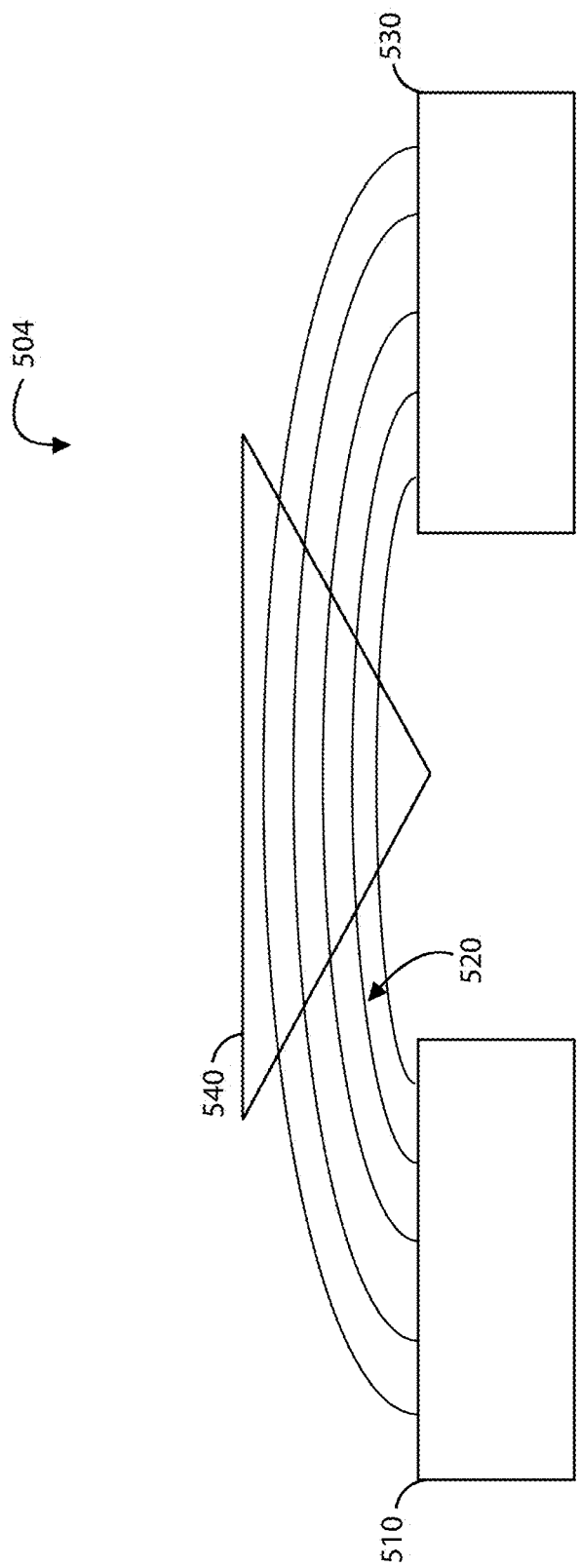

FIG. 5D depicts configuration 504 with an AWG having grating arm areas with 2 different indices. This configuration shows a similar structure to FIGS. 5A-5C, with a first propagation region 510 coupled to a second propagation region 530 by a diffraction grating structure 520. However, the AWG structure 520 shown here includes grating arm areas defined by grating index structure 540. The area of the waveguide gratings within the structure 540 is configured with a different index than the waveguide gratings outside of structure 540.

Figure 6A:
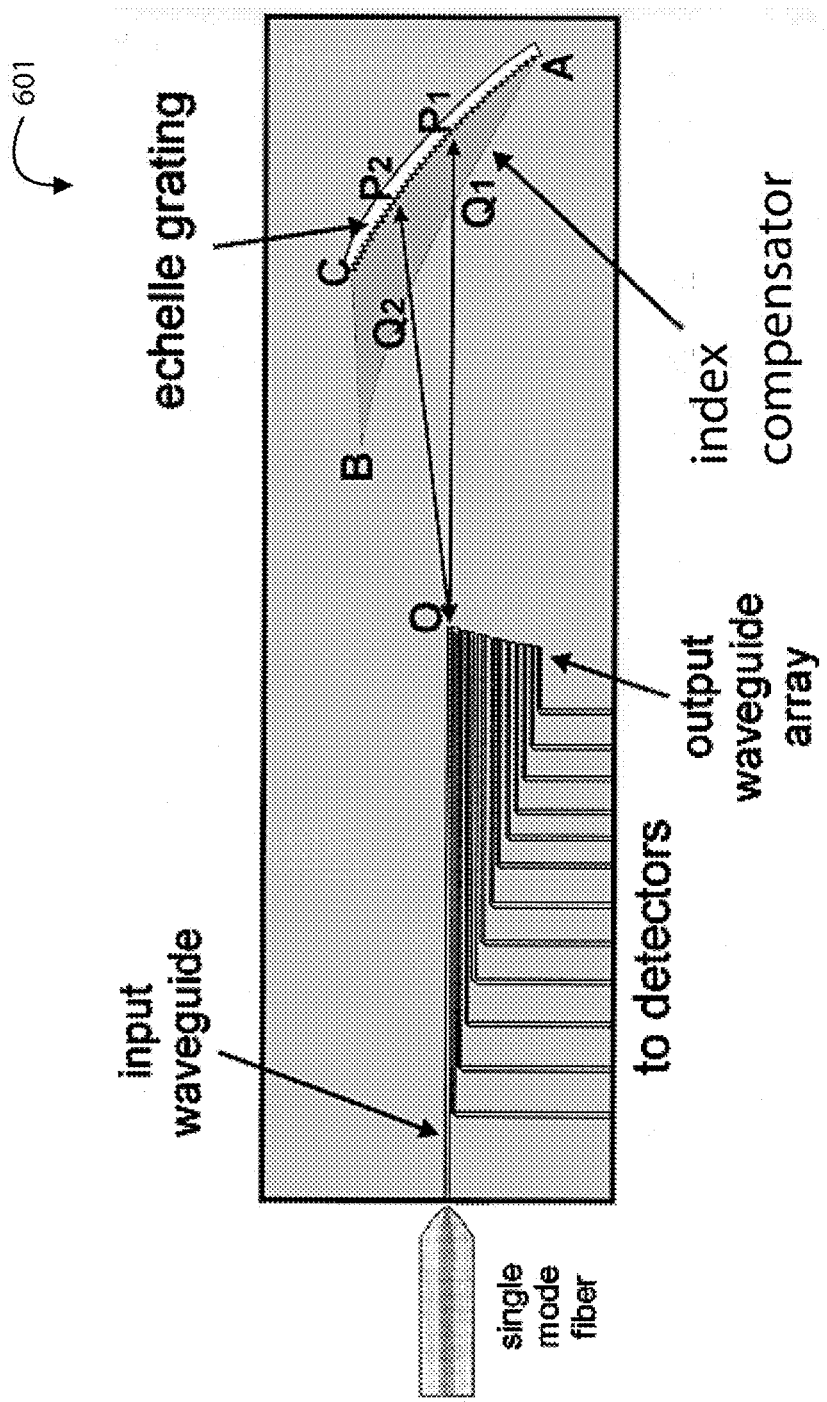
FIG. 6A is a simplified diagram illustrating a diffraction grating configuration according to an embodiment of the present invention.

FIG. 6A is a simplified diagram illustrating an Echelle grating configuration according to an embodiment of the present invention. Configuration 601 shows a single mode fiber input feeding into an input waveguide. The output waveguides are shown to be coming from the Echelle grating and directed to photo diodes. The Echelle grating structure has an index compensator in its free propagation region, shown by the darkened region denoted by n' compared to the outer region denoted by n.

Using this configuration, the following can be determined:

$$\lambda' = \lambda \cdot \left(1 + \frac{n-n'}{n}\gamma\right) \quad \gamma = -\frac{\Delta l}{\Delta L} \quad \begin{array}{l} \Delta l = P_2Q_2 - P_1Q_1 \\ \Delta L = OP_2 - OP_1 \end{array}$$

where $\lambda'$ is the wavelength after compensation, and $\lambda$ is the wavelength before compensation Although this idea is known for compensating polarization dependence of Echelle grating, by these calculations, this configuration is shown to also reduce the sensitivity of $\lambda c$ to Si thickness variation. The same compensation idea can be applied in the AWG having 2 different index materials shown in FIG. 5D.

TABLE 1

$\lambda c$ sensitivity to Si thickness variation @ PI condition

Echelle: $\lambda c$ sensitivity to Si thickness

| Top Si thickness | Compensation | TE $\lambda c$ sensitivity | TM $\lambda c$ sensitivity |
|---|---|---|---|
| 220 nm | w/o compensation | 1.28 nm/nm | 3.50 nm/nm |
|  | w/compensation | 0.86 nm/nm | 0.68 nm/nm |
| 300 nm | w/o compensation | 0.65 nm/nm | 1.53 nm/nm |
|  | w/compensation | 0.43 nm/nm | 0.08 nm/nm |

Table 1 shown above further describes the differences of using different top silicon thicknesses and compensation. With the 220 nm thickness, the TM $\lambda c$ sensitivity to Si thickness without compensation is noted to be very high compared to the other values. By adding compensator, TM $\lambda c$ sensitivity is reduced to 20% of the original value. With the 300 nm top Si thickness, the sensitivity to Si thickness is less severe without compensator, and even less so with compensation. Shown by these numbers, different indices can be realized by different silicon core thicknesses (by partially etching the Si) or by depositing different cladding material (e.g. $SiO_2$, $SiN_x$, etc.).

Figure 6B:
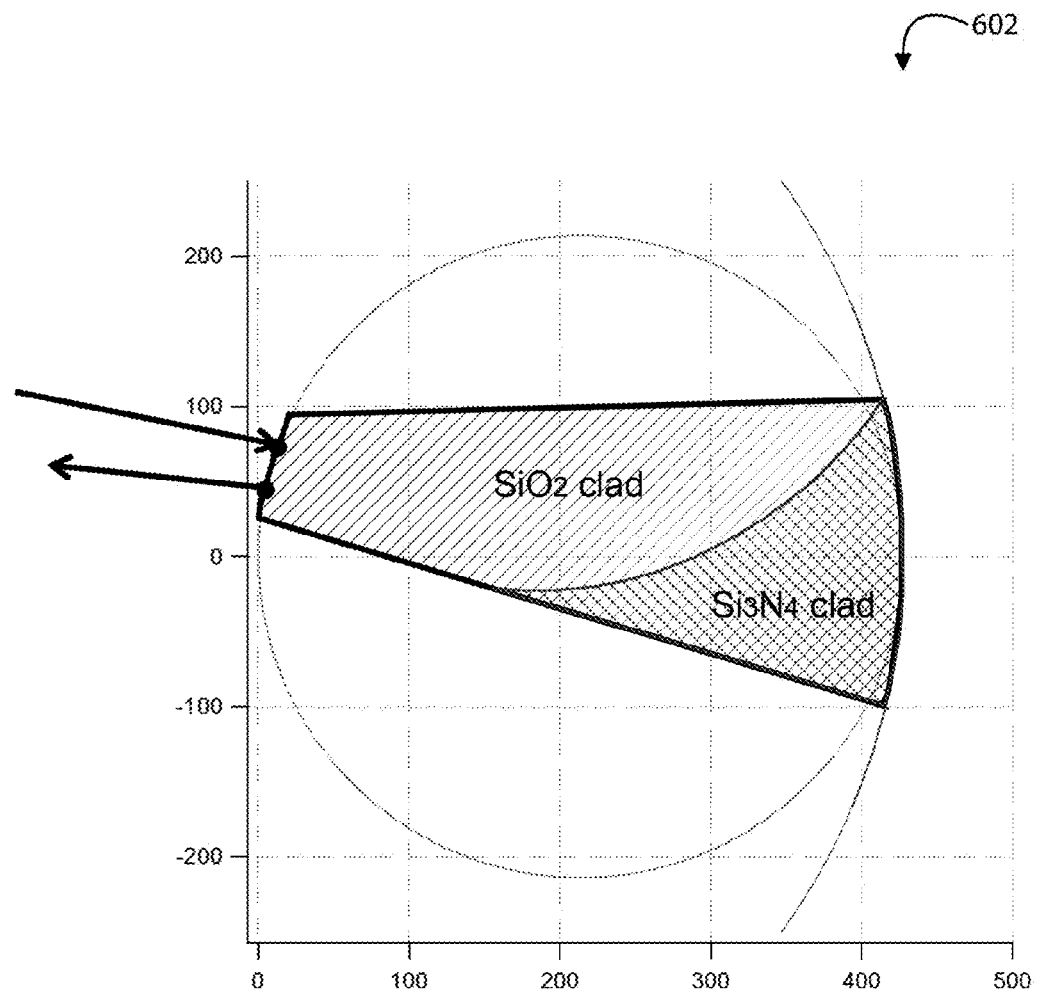
FIG. 6B is a simplified diagram illustrating an echelle grating design according to an embodiment of the present invention.

FIG. 6B is a simplified diagram illustrating an Echelle grating design according to an embodiment of the present invention. More specifically, this design 602 shows a combination of $SiO_2$ clad and $Si_3N_4$ clad for 300 nm Si. These two clad materials are shown with proportions according to the scale markings in nanometers. The use of compensation materials such as these clad materials is a technique that is similar to the configuration shown in FIG. 5D.

Depending on the application, the silicon photonics devices and diffraction grating configurations described previously can be implemented in various communication systems and interfaces. Further details regarding embodiments of the communications systems and interfaces are described below.

In the last decades, with advent of cloud computing and data center, the needs for network servers have evolved. For example, the three-level configuration that have been used for a long time is no longer adequate or suitable, as distributed applications require flatter network architectures, where server virtualization that allows servers to operate in parallel. For example, multiple servers can be used together to perform a requested task. For multiple servers to work in parallel, it is often imperative for them to be share large amount of information among themselves quickly, as opposed to having data going back forth through multiple layers of network architecture (e.g., network switches, etc.).

Leaf-spine type of network architecture is provided to better allow servers to work in parallel and move data quickly among servers, offering high bandwidth and low latencies. Typically, a leaf-spine network architecture uses a top-of-rack switch that can directly access into server nodes and links back to a set of non-blocking spine switches that have enough bandwidth to allow for clusters of servers to be linked to one another and share large amount of data.

In a typical leaf-spine network today, gigabits of data are shared among servers. In certain network architectures, network servers on the same level have certain peer links for data sharing. Unfortunately, the bandwidth for this type of set up is often inadequate. It is to be appreciated that embodiments of the present invention utilizes PAM (e.g., PAM8, PAM12, PAM16, etc.) in leaf-spine architecture that allows large amount (up terabytes of data at the spine level) of data to be transferred via optical network.

Figure 7A:
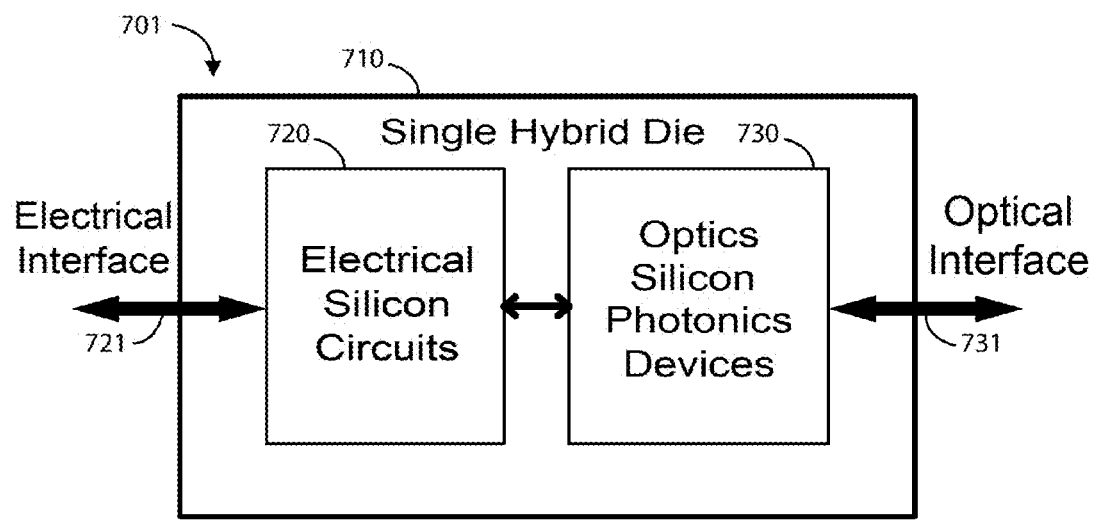
FIG. 7A is a simplified diagram of a single hybrid die (Both electrical and optics devices are fabricated on a single hybrid die) according to an embodiment of the present invention.

FIG. 7A is a simplified diagram of a single hybrid die (Both electrical and optics devices are fabricated on a single hybrid die) according to an embodiment of the present invention. In an example, the present device 701 comprises a single hybrid communication module made of silicon material. The module comprises a substrate member 710 having a surface region, an electrical silicon chip 720 overlying a first portion of the surface region, an silicon photonics device 730 overlying a second portion of the surface region, a communication bus coupled between the electrical silicon chip and the silicon photonics device, an optical interface 721 coupled to the silicon photonics device 730, and an electrical interface 721 coupled to the electrical silicon die 720.

Figure 7B:
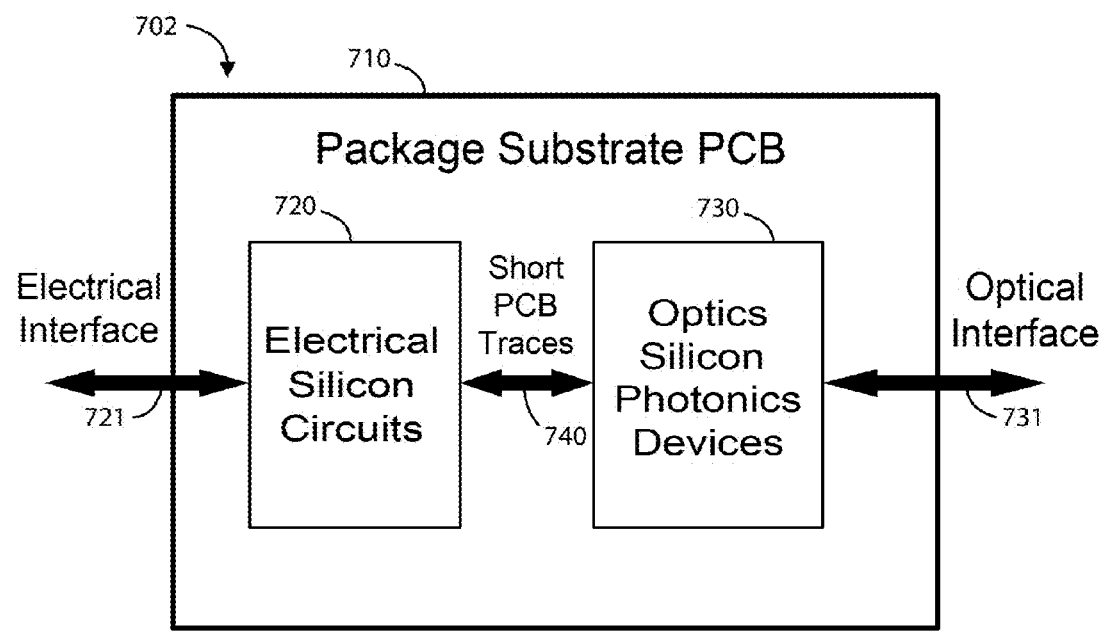
FIG. 7B is a simplified diagram of a multi-chip module according to an embodiment of the present invention.

FIG. 7B is a simplified diagram of a multi-chip module according to an embodiment of the present invention. In an example, the present device 702 comprises a single hybrid communication module. The module comprises a substrate member 710 having a surface region, which can be a printed circuit board or other member. The module comprises an electrical silicon chip 720 overlying a first portion of the surface region, a silicon photonics 730 device overlying a second portion of the surface region, a communication bus 740 coupled between the electrical silicon chip and the silicon photonics device, an optical interface 731 coupled to the silicon photonics device 730, and an electrical interface 721 coupled to the electrical silicon die 720.

In an embodiment, the present invention provides a silicon photonics device. This device includes a substrate member, a SOI layer overlying the substrate member, and a waveguide structure overlying the substrate member. The SOI layer is characterized by a top silicon thickness of 300 nm, and the waveguide structure is configured from a portion of the SOI layer. The SOI layer can include a crystalline silicon layer overlying a buried oxide layer.

In a specific embodiment, the waveguide structure can include an AWG structure with 300 nm×300 nm symmetric grating waveguides. This AWG structure can include an index compensator material configured to provide the AWG with at least two material index ratings. The waveguide structure can include an Echelle grating structure characterized by a top silicon thickness of 300 nm. In a specific embodiment, the Echelle grating structure includes an index compensator material configured to provide the Echelle grating structure with at least two material index ratings. Also, the index compensator material for either the AWG or Echelle structure can include $SiO_2$, $Si_3N_4$, SiOxNy, air, index matching fluid/oil/epoxy/glue or $SiN_x$ as a cladding material, or the like.

In an embodiment, the present invention provides a silicon photonics device. This device includes a substrate member, a PBS, a TE optimized demux, a TM optimized demux, and a plurality of PD structures all overlying the substrate. The PBS includes a TE+TM input and a TE output and a TM output. The TE demux has a plurality of TE demux outputs and a TE demux input coupled to the TE output. The TM demux has a plurality of TM demux outputs and a TM demux input coupled to the TM output. Also, each of the PD structures are coupled to one of the plurality of TE demux outputs by a TE-PD path and one of the plurality of TM demux outputs by a TM-PD path.

In a specific embodiment, the TE-PD path coupled to each of the PD structures and the TM-PD path coupled to each of the PD structures are configured to be substantially time delay compensated using delay lines. The TE-PD path and TM-PD path can be coupled on opposite sides of the PD structure or coupled on the same side with an offset from the center of the PD structure. The PD structure can also include a first PD electrically coupled to a second PD, wherein the TE-PD path is coupled to the first PD and the TM-PD path is coupled to the second PD. Those of ordinary skill in the art will recognize other variations, modifications, and alternatives.

In a specific embodiment, each of the plurality of PD structures includes a PBC having a PBC output coupled to a PD. The PBC can include a PBC TE input coupled to one of the plurality of TE demux outputs and a PBC TM input coupled to one of the plurality of TM demux outputs. The TE optimized demux and the TM optimized demux can include a waveguide structure selected from an AWG (Arrayed Waveguide Gratings) structure with 300 nm×300 nm grating waveguides, an Echelle gratings structure with 300 nm top silicon thickness, or the like. Also, the waveguide structure can include an index compensator material selected from: $SiO_2$, $Si_3N_4$, SiOxNy, air, index matching fluid/oil/epoxy/ glue or $SiN_x$ as a cladding material, or the like.

In an embodiment, the present invention provides a silicon photonics device. This device includes a substrate member, a polarization dependent demux and a plurality of PD structures overlying the substrate member. The polarization dependent demux can include a TE+TM input and a plurality of TE outputs and a plurality of TM outputs. Each of the PD structures can be coupled to one of the TE outputs by a TE-PD path and one of the TM outputs by a TM-PD path. Each of these TE-PD and TM-PD path pairs for a PD structure can be configured to be substantially time delay compensated using delay lines. The path coupling configurations for the PD structure can be similar to the embodiments described previously.

In an embodiment, the present invention provides a silicon photonics device. This device includes a substrate member, a PBS, a polarization dependent demux, and a plurality of PD structures all overlying the substrate member. The PBS can have a TE+TM input and a TE output and a TM output. The polarization dependent demux can have a TE demux input coupled to the TE output and a TM demux input coupled to the TM output. The polarization dependent demux can also have a plurality of TE+TM demux outputs. Each of the PD structures can be coupled to one of the plurality of TE+TM demux outputs b a common delay line.

In an embodiment, the present invention provides a polarization independent multiplexer/demultiplexer including a waveguide characterized by a repeating feature of an AWG/ Echelle grating configured such that a TE light and a TM light focus to the same waveguide, wherein the TE light input and the TM light input are characterized by different grating orders.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A system comprising a silicon photonics device, the system comprising:
  a silicon photonics device comprising:
    a substrate member;
    a PBS (Polarization Beam Splitter) overlying the substrate member, the PBS having a TE+TM (Transverse Electric+Transverse Magnetic) input and a TE output and a TM output;
    a TE optimized demux (demultiplexer) overlying the substrate member, the TE optimized demux having a TE demux input coupled to the TE output, the TE optimized demux having a plurality of TE demux outputs;
    a TM optimized demux overlying the substrate member, the TM optimized demux having a TM demux input coupled to the TM output, the TM optimized demux having a plurality of TM demux outputs; and
    a plurality of PD (photodiode) structures overlying the substrate, each of the PD structures being coupled to one of the plurality of TE demux outputs by a TE-PD path and one of the plurality of TM demux outputs by a TM-PD path; and
  wherein the TE optimized demux and the TM optimized demux comprises a waveguide structure selected from a group consisting of: an AWG (Arrayed Waveguide Gratings) structure with 300 nm×300 nm grating waveguides, an Echelle gratings structure with 300 nm top silicon thickness; and
  an interface coupled to the silicon photonics device.

2. The system of claim 1 wherein the TE-PD path coupled to each of the PD structures and the TM-PD path coupled to each of the PD structures are configured to be substantially time delay compensated using delay lines.

3. The system of claim 1 wherein for each PD structure the TE-PD path and the TM-PD path are coupled on opposite sides of the PD structure or coupled on the same side of the PD structure with an offset from the center.

4. The system of claim 1 wherein each PD structure comprises a first PD electrically coupled to a second PD, and wherein the TE-PD path is coupled to the first PD and the TM-PD path is coupled to the second PD.

5. The system of claim 1 wherein each of the plurality of PD structures comprises a PBC (Polarization Beam Combiner) having a PBC output coupled to a PD, and wherein the PBC comprises a PBC TE input coupled to one of the plurality of TE demux outputs and a PBC TM input coupled to one of the plurality of TM demux outputs.

6. The system of claim 1 wherein the waveguide structure comprises an index compensator material selected from a group consisting of: SiO2, Si3N4, SiOxNy, air, index matching fluid/oil/epoxy/glue or SiNx as a cladding material.

7. A system comprising a silicon photonics device, the system comprising:
 a silicon photonics device comprising:
  a substrate member;
  a PBS (Polarization Beam Splitter) overlying the substrate member, the PBS having a TE+TM (Transverse Electric +Transverse Magnetic) input and a TE output and a TM output;
  a polarization dependent demux (demultiplexer) overlying the substrate member, the polarization dependent demux having a TE demux input coupled to the TE output and a TM demux input coupled to the TM output, the polarization dependent demux having a plurality of TE+TM demux outputs; and
  a plurality of PD (photodiode) structures overlying the substrate, each of the PD structures being coupled to one of the plurality of TE+TM demux outputs by a common delay line; and
 an interface coupled to the silicon photonics device.

8. The system of claim 7 wherein the TE output comprises a TE path and the TM output comprises a TM path, and wherein the TE and TM path are configured to be substantially time delay compensated using delay lines.

9. A system comprising:
 a polarization independent multiplexer/demultiplexer device comprising a waveguide characterized by a repeating feature of an AWG/Echelle grating configured such that a TE light input and a TM light input focus to the waveguide, wherein the TE light and the TM light are characterized by different grating orders; and
 an interface coupled to the polarization independent multiplexer/demultiplexer device.

* * * * *